United States Patent [19]

Whiteing et al.

[11] 3,930,224

[45] *Dec. 30, 1975

[54] TRANSMISSION OF INFORMATION

[76] Inventors: Roland G. Whiteing, 45 Duncan Road, Glenferness, Johannesburg, Transvaal Province; Johannes G. van Mill, 12 Lucas Road, Eastleigh, Edenvale, Transvaal Province, both of South Africa

[ * ] Notice: The portion of the term of this patent subsequent to Oct. 8, 1991, has been disclaimed.

[22] Filed: Apr. 23, 1973

[21] Appl. No.: 353,655

Related U.S. Application Data

[63] Continuation-in-part of Ser. No. 252,227, May 11, 1972, Pat. No. 3,840,850.

[30] Foreign Application Priority Data

Nov. 7, 1972 South Africa...................... 72/7885

[52] U.S. Cl. .............. 340/58; 73/146.5; 200/61.25; 340/258 C
[51] Int. Cl.² ......................................... B60C 23/02
[58] Field of Search.................... 340/58, 60, 258 C; 200/61.22, 61.25; 73/146.5, 146.8; 335/206, 335/207, 153; 324/167, 168; 325/113

[56] References Cited
UNITED STATES PATENTS

| | | |
|---|---|---|
| 2,269,083 | 1/1942 | Langsam et al....................... 340/58 |
| 2,475,533 | 7/1949 | Varner................................ 340/58 |
| 3,093,812 | 6/1963 | Brown................................. 340/58 |
| 3,659,734 | 5/1972 | Fuzzell............................... 335/207 |
| 3,662,335 | 5/1972 | Fritze................................ 340/58 |
| 3,665,387 | 5/1972 | Enabnit.............................. 340/58 |
| 3,715,719 | 2/1973 | Sugiyama......................... 200/61.25 |
| 3,781,787 | 12/1973 | Sugiyama......................... 200/61.25 |

*Primary Examiner*—John W. Caldwell
*Assistant Examiner*—Joseph E. Nowicki
*Attorney, Agent, or Firm*—Cushman, Darby & Cushman

[57] ABSTRACT

A warning device associated with a rotatable body comprising means on the rotatable body for creating a magnetic field, a receiving coil on a relatively stationary member arranged such that upon rotation of the rotatable body interaction with the magnetic field causes electrical pulses to be generated in the receiving coil and an electronic switching circuit operated by the pulses such that a warning is given upon occurrence of a predetermined condition, such as pressure of a vehicle wheel deviating outside a predetermined limit.

6 Claims, 14 Drawing Figures

TRANSMISSION OF INFORMATION

The present application is a continuation-in-part of application Ser. No. 252,227, filed on May 11, 1972, now U.S. Pat. No. 3,840,850.

This invention relates to a method and apparatus for conveying information, generally in connection with the physical state of a moving and generally rotating body, from the moving body to a relatively stationary object and more particularly but not exclusively, the invention is concerned with warning devices adapted to be actuated when the physical state of a moving body or part thereof deviates from a certain or desired physical state.

Still more particularly but not exclusively, the invention relates to a self-generating safety or warning device for use on wheeled vehicles having pneumatic tires such as motor cars, road transport vehicles and aircraft having landing wheels, the device being adapted to warn the person in charge of the vehicle that the tire pressure or temperature has deviated outside a predetermined safe range.

In the case of wheeled vehicles fitted with pneumatic tires and particularly road transport vehicles having double wheel assemblies, large costs are often incurred in purchasing new tires, owing to the fact that the vehicle has had a flat tire without the driver being aware thereof in sufficient time to avoid irreparable damage to the tire. In the case of double wheel assemblies, both tires are often irreparably damaged owing to the side-walls of the two tires rubbing against each other.

In any event, in the case of any motor vehicle, a dangerous situation can arise where tire pressures of wheels fall below a certain minimum.

In order to detect such flat or soft tires, slip-ring assemblies, radio transmitters and sonic devices have been proposed for transmitting information from the wheels to the axle of a vehicle but these, as far Applicants are aware, have either not been successful and/or have been extremely costly.

In other fields, such as in the case of machinery, it is often important to be warned of alterations in the physical state of rotatable bodies such as, for example, the speed of rotation of a body either per se or in relation to the speed of rotation of another body.

It is accordingly the object of this invention to provide a method and apparatus for transferring information from a movable body to an adjacent relatively fixed body as well as a warning system incorporating such transmission method and apparatus which operates effectively and is relatively inexpensive.

In accordance with this invention there is provided a self-generating method of transmitting information from a moving body to a stationary member adjacent the moving body comprising locating on the moving body means for creating a magnetic field which is arranged to co-act with at least one receiving coil on the stationary member to create pulses of electrical current therein upon movement of the body and processing the pulses to achieve a desired objective, the pulses being created at a frequency proportional to the velocity of the moving body relative to the stationary member and the generation of the pulses further being optionally dependent on a physical condition of a part or the whole of the moving body.

Further features of the invention provide for the magnetic field to be created either intermittently or continuously, for the moving body to be a rotating one and that in the case where the physical condition of the rotating member is the speed of rotation thereof, the frequency of pulses created is compared electronically with a reference chain of pulses optionally created in like manner by a second rotating member, for the electronic comparison of these chains of pulses to be arranged to give a signal should the frequencies differ to any predetermined extent and for the two rotating members to be parts of a transmission drive of a vehicle on the input and output sides thereof.

In the case where information about other physical conditions is required, for example, the temperature of a part of the rotating body or the tire pressure in the case of a wheel carrying a pneumatic tire, the invention provides for the magnetic field to be created intermittently by a magnet on the stationary member co-acting with a first coil on the rotating member, the first coil being connected in series or parallel with a second coil which is arranged to co-act with the receiving coil on the stationary member, the circuit on the rotating member including a sensing device (such as a temperature or pressure operated switch) arranged to initiate or terminate the creation of pulses depending on the physical condition sensed by the sensing device.

It is also possible, by correct design thereof, to use a single coil on the rotating member and also a single coil on the stationary member.

The above and other features of the invention will become apparent from the following description of various embodiments of the invention, reference being made to the accompanying drawings in which:-

Figure 8:
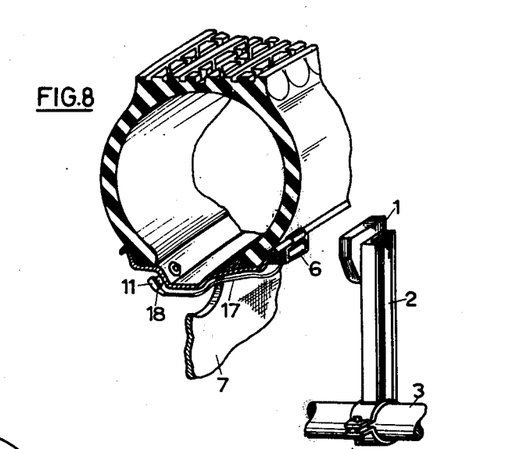
FIG. 8 is a cross-section through part of a wheel showing the mounting of the coils and magnet.

In the embodiment of the invention illustrated in FIGS. 1 to 8, a "receiver" unit 1 is fitted to a stationary part of a vehicle adjacent each of the wheel assemblies thereof. As illustrated in FIG. 8, this may be done with the aid of a support 2 secured to the axle 3 associated with each wheel assembly. Alternatively, the receiver unit may be secured to a brakeshoe supporting disc of a drum brake assembly if this is more convenient. Each of these receiver units embodies a magnet 4 which may be either an electro- or a permanent magnet and a receiving coil 5 connected into a control circuit which is described below. Preferably, the magnet and receiving coil are embedded or encapsulated in a suitable material to prevent damage thereto by stones, dust, water, snow, mud and the like thrown up by the vehicle during driving thereof, and further to prevent corrosion.

Figure 6:
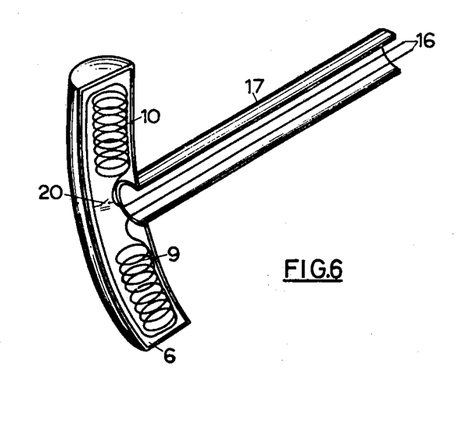
FIG. 6 is a sectional isometric view of a unit to be secured to a wheel.
Figure 7:
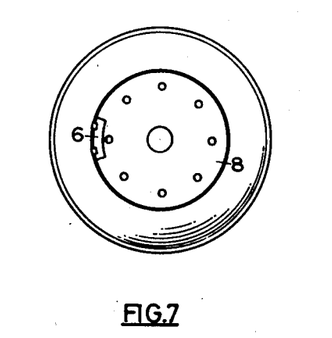
FIG. 7 is an elevation of the inside of a wheel carrying the unit of FIG. 5.

A transmitter unit 6 is mounted on each wheel assembly 7 to rotate therewith. In the present embodiment the transmitter units are of arcuate shape, as shown in FIG. 6 and are arranged to be fitted to a wheel 8 on the inside thereof in the manner of a balancing weight. However, where each receiver unit is secured to a brake-shoe supporting disc, the transmitter unit will be secured to the associated brake drum. In either case each pair of associated units are arranged such that upon rotation of a wheel the transmitter unit closely passes the receiver unit once per revolution.

Each transmitter unit 6 in this embodiment comprises two coils 9 and 10, the ends of which are electrically connected to form an electrical loop which is interrupted by a sensing switch, in this case a pressure switch 11 arranged to be operated by the pressure of the associated tire. Again these coils are embedded or encapsulated in suitable material to prevent damage thereto during use. This pressure switch is arranged to be closed when the tire pressure is above a predetermined minimum but to open upon the tire pressure falling below such minimum value.

Figure 5:
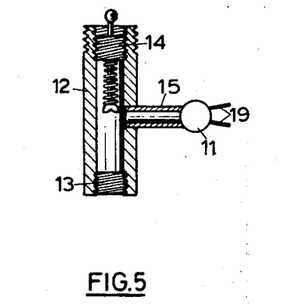
FIG. 5 is a sectional elevation of a tire valve assembly for use in the arrangement.

As illustrated in FIG. 5, each tire is thus provided with a valve fitting 12 which is fitted onto the existing valve lug after removal of the valve itself therefrom, a complementary socket 13 being provided on the fitting for this purpose. The fitting is tubular in shape and is supplied at its end remote from the socket with a valve 14 and intermediate its ends is a branch 15 to which is secured the pressure switch 11.

To enable this switch to be connected into the loop which includes the two coils, leads 16 (FIG. 6) passing through a tube 17 extending from the transmitter unit are provided, the tube passing through a hole in the wheel (FIG. 8) and being provided with a sealing cap 18 which seals over the pressure switch. The leads 16 are electrically connected to the two terminals 19 (FIG. 5) of the pressure switch.

Finally, a reed switch 20 (FIG. 1) is connected across the one coil 10 of the transmitter unit, the function of the reed switch being to create a large back E.M.F. by the opening of this switch at a predetermined time when the two units of a pair are passing each other, the reed switch being operated by the magnet such that it is moved from its normally open position to a closed condition prior to its re-opening which causes the back E.M.F. This back E.M.F. results in a large pulse being created in the two coils of the transmitter unit which in turn results in a readable pulse being created in the receiver coil 5 of the receiver unit as a consequence of the magnetic field caused by the pulse in the transmitter coils.

In the case of a double wheel assembly, only one pair of units will be provided in general with the pressure switch on each tire being connected into the loop formed by the two coils in the transmitter unit. These two switches will be connected in series in the case of the present embodiment but will be connected in parallel in the simple version described hereinafter.

Figure 1:
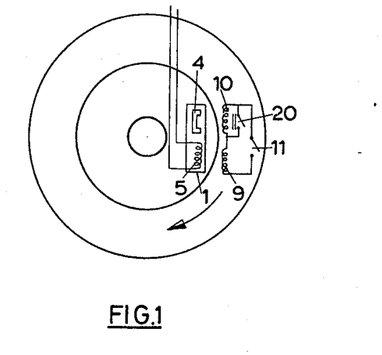
FIG. 1 is a diagrammatic illustration of a tire pressure sensing arrangement.
Figure 2:
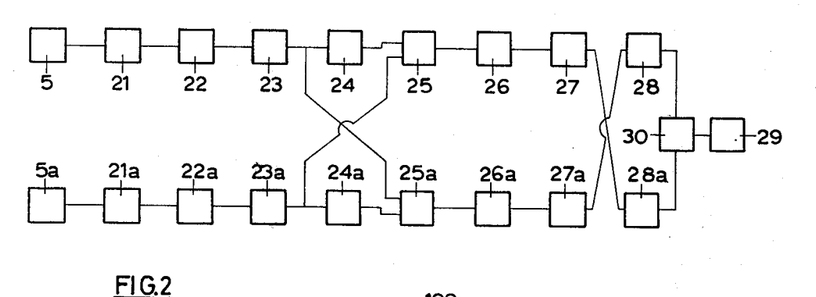
FIG. 2 is a block diagram illustrating the functions of each part of the circuit of the arrangement.

Referring now to FIG. 2, each receiver coil 5 is connected to the input of an amplifier 21, the output of which is fed to a timer circuit 22 which is adapted to give a negative output when more than a predetermined number of pulses per second are received from the amplifier. For the description of this circuit negative is earth and thus positive refers to the logic indication 1 and negative to the logic indication 0. In this case the timer circuit is arranged to give a negative output if more than one pulse per second is received thereby and a positive output if less than one pulse per second is received thereby. The output from the timer circuit is fed to a digital control circuit which is interconnected with a second digital control circuit fed by an amplifier 21a and timer circuit 22a connected to the receiver coil 5a associated with another wheel on the vehicle, this other wheel conveniently being the corresponding wheel on the other side of the vehicle.

In each case the digital control circuit comprises two inverters and a NOR gate in series, the output from the first inventer 23, 23a being connected to the input of the second inverter 24, 24a and to the one input of the NOR gate 25a, 25 of the other circuit, the output from the second inverter 24, 24a being connected to the other input to the associated NOR gate 25, 25a.

The NOR gate thus operates such that the output therefrom is always negative while at least one input thereto is positive, and the output is only positive if both inputs to the NOR gate are negative.

The output from the NOR gate 25, 25a is fed to a delayed trigger 26, 26a which is arranged to fire an electronic switch 27, 27a in the form of a silicon controlled rectifier (SCR). Each SCR is arranged to close a circuit to a red light bulb 28, 28a and simultaneously to switch off a common green light bulb 29 and to activate a buzzer 30 which is connected into the circuit such that it may be isolated by a switch 31 (see FIG. 3) if desired.

It will be understood that a comparison of signals is thus effected at the NOR gate, this comparison being such that the following outputs from the NOR gates are obtained:

a. While pulses are received from both receiving coils 5 and 5a one input to each NOR gate is positive and thus the output from the NOR gate is negative.

b. When pulses are created in only one receiving coil, said that indicated by numeral 5a, both inputs to the NOR gate 25a associated with this receiving coil 5a are negative thus causing the NOR gate 25a to have a positive output. This is fed to the delayed trigger 26a. This trigger is arranged to take about 2 seconds to fire the SCR and thus after 2 seconds the SCR 27a will be fired. Since the fault (i.e. the absence of pulses) is in the other receiving coil circuit, the SCR 27a is connected to close the circuit of the red light bulb 28 associated with the other circuit thus giving a correct location of the fault.

c. When pulses are created in neither coil, which will be the case when the vehicle is stationary, again one input to each NOR gate is positive and no red light bulbs will be illuminated, since no output is obtained from either NOR gate.

Figure 3:
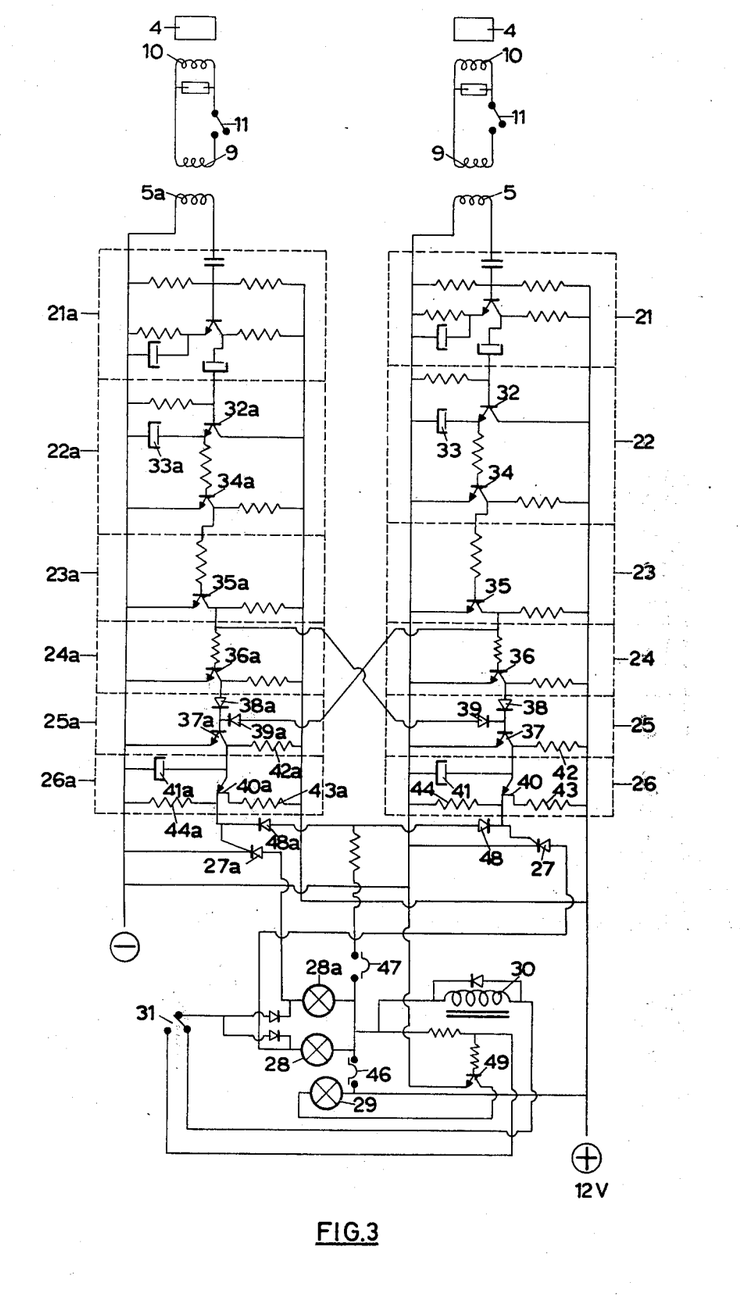
FIG. 3 is a circuit diagram of a complete circuit of the arrangement.

The full circuit diagram is illustrated in FIG. 3 from which it will be seen that the various circuits described with reference to the block diagram are as follows:- a. The circuit of the amplifier 21 comprises a common emitter single stage transistor amplifier of conventional design.

b. The circuit of the timer comprises a first transistor 32, the base of which is connected to the output from the amplifier 21 and which is arranged to intermittently charge an electrolytic capacitor 33 according to the frequency of pulses received by the first transistor 32. This capacitor 33 biases a second transistor 34 in such a way that the output of this transistor is negative when the capacitor is charged. Thus if the frequency of the pulses received by the first transistor 32 is insufficient to maintain the capacitor in a charged condition, the second transistor 34 will stop conducting and the output from this transistor 34 will become positive. The values of the components of this timer circuit are chosen to allow a time delay of about one second without the output from the second transistor 34 going positive.

c. The first inverter 23 comprises a transistor 35 which is arranged to reverse the polarity of the signal received from the timer circuit and provide the correct polarity of the one input to the NOR gate 25a in the other circuit.

d. The second inverter comprises a transistor 36 which again reverses the polarity of the signal to provide an input to the NOR gate of the original polarity of the output from the timer circuit.

e. The NOR gate comprises a transistor 37 having the base thereof connected to two diodes 38, 39 the one 38 of which is connected to output of the second inverter and the other 39 of which is connected to output from the first inverter 23a of the other circuit. Thus this transistor 37 will be in a conducting condition when either or both inputs to the diodes are positive but will switch over to a non-conducting condition when both inputs are negative thus giving a positive output in this case.

f. The delayed trigger comprises a unijunction transistor 40, the emitter of which is connected to the output from the NOR gate 25. This unijunction is delay biased by an electrolytic capacitor 41 connected between earth and the emitter. The unijunction will conduct on a predetermined voltage on the emitter being attained which will occur when the capacitor 41 has been charged sufficiently. The time delay is thus dependent on the value of a resistor 42 connected between the emitter of the unijunction and the positive supply and through which the capacitor is charged.

The timer circuit further comprises a pair of resistors 43 and 44 which are interconnected through the bases of the unijunction, these resistors acting as a voltage divider when the unijunction conducts. The output from the unijunction is connected to the gate of the SCR 27 which is connected into the power supply to the appropriate red light bulb 28.

The capacitor 41 in the trigger circuit is arranged to take about two seconds to fire the unijunction, thus, since one pulse per revolution is created by the coils and these pulses cannot be more than 360° out of phase, a light cannot possibly go on while all is in order unless the difference in the speed of rotation of the pair of wheel assemblies is greater than one revolution per 2 seconds. This is unlikely to occur unless a wheel is seized or the brake drag on a wheel is at least substantial.

The red light bulbs 28, 28a are located on an annunciator panel 45 (see FIG. 4) which is illuminated and depicts a mimic diagram of the wheel pattern of the vehicle such that the bulb behind the appropriate wheel will light up in the event of a low pressure tire or in the event of a brake seizure.

It will be seen from the circuit diagram that a red light bulb, once lit will remain in this condition until a cancel switch 46 in the circuit is depressed whereupon the SCR will return to a nonconducting condition owing to the fact that the anode voltage of the SCR is removed.

This circuit also includes a test switch 47 for firing the SCRs which will cause illumination of all the red light bulbs 28 in order to test the circuit. Since the connection between the gates of the SCRs and the test switch will be common, each gate is connected to the test switch through a separate diode 48 which thus prevents all the SCRs being fired when one is fired due to a fault.

Figure 4:
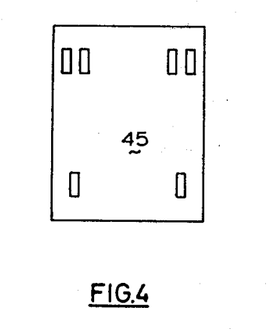
FIG. 4 is a plan view of an annunciator panel to be used in the arrangement.

Furthermore, the green light bulb 29 is located behind the panel 45, this bulb being arranged such that the panel glows a green color while all is in order.

This green light bulb is supplied through an electronic switch in the form of a transistor 49 which switches the light off immediately the circuit of a red light bulb is switched on whether the red light bulb is in an operative condition or not. This, therefore, provides an extra safeguard against blown light bulbs. If a circuit of a blown red light bulb is closed the green light goes off and by pressing the test button all red lights will go on except for the blown bulb so that the location of the fault will again be known.

Finally, this circuit is also provided with the audible alarm in the form of the buzzer 30 which may be switches to an operable or inoperable position as required by the two position switch 31.

In use, when the vehicle is stationary, both timer outputs of a pair of wheels will be positive and thus, owing to the digital control circuit no red light bulbs will be illuminated, although no pulses are received by the amplifiers.

When the wheels are turning and not more than one revolution per two seconds difference in speed of rotation exists between them, pulses will be created by the magnet in the closed coil circuit of the transmitter unit, these pulses being transmitted by the resultant magnetic fields to the stationary receiver coils 5, 5a which in turn maintain the timer outputs negative.

If during driving of the vehicle the pressure in a tire decreases below a certain minimum, the pressure switch associated with the tire will open, thereby terminating the generation of the intermittent magnetic field on that transmitter unit and thus also terminating the train of pulses to the amplifier. The output from the appropriate timer will go positive, thus giving rise to the appropriate SCR being triggered and the red warning light going on, thus giving an immediate warning of a tire with low pressure.

It will be appreciated that many variations may be made to the above-described embodiment of the invention without departing from the scope of the invention.

Figure 9:
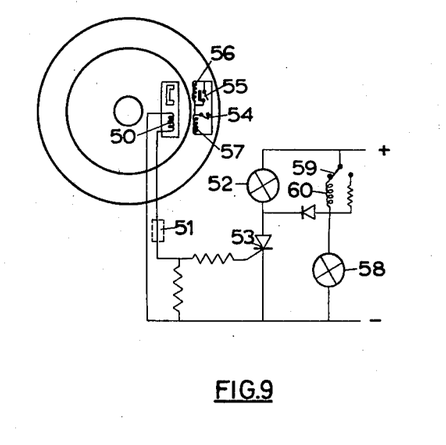
FIG. 9 is a diagrammatic illustration of a simple version of the warning device utilizing pairs of coils.

Thus, as in the case of the simplified embodiment illustrated in FIG. 9, the pressure switches may be arranged to allow a chain of pulses to be created in a stationary receiving coil 50 only in the event of an undesirably low pressure being detected. In this case, the pulses could simply be amplified if necessary by an amplifier 51 and used to switch a bulb 52 on directly by way of an SCR 53 without comparision with another signal, thus obviating the necessity of the digital control circuits. In order to achieve this, the pressure switch 54 in the transmitter unit could be connected in parallel to the reed switch 55 (i.e. across the ends of each coil 56 and 57). Thus under normal conditions a short circuit exists between the ends of the coils, this short circuit opening in the case of a fault developing. Thus, no comparison is required, since pulses are not generated when all is in order and the vehicle is stopped.

This simplified version may also be provided with a green light bulb 58 to indicate that all is in order and a two position switch 59 allowing a buzzer 60 to be included in parallel with the red light bulb or to be isolated as desired. The green light bulb will again go off when a red light bulb is illuminated, one red light again being provided for each wheel behind an annunciator panel if desired.

The above embodiments of the invention could also be used to warn of high temperatures in tires on aircraft or other vehicles, for example, the pressure switch simply being replaced by, or connected in series with, a temperature switch. Also, by providing double action switches predetermined high and low conditions may be sensed and a warning given thereof.

Whilst the receiving coil and magnet in the case of the receiver unit and the two coils in the case of the transmitter unit have been described as being adjacent each other, they could be off-set angularly to any desired extent provided they still interact correctly. In the extreme case they would be 180° offset, in which case two pulses per revolution could be obtained by providing a reed switch across each of the coils in the transmitter unit. Of course, any desired number of pulses per revolution may be obtained in a manner which will be clear to those skilled in the art.

In general in order to prevent interference from external causes, the wires from the receiver units to the switching circuits located behind the display panel will have to be shielded cables. In order to avoid the use of such cables the embodiments illustrated in FIGS. 10 to 14 have been constructed and have proved to operate effectively. Also, these embodiments involve the use of only one coil in the transmitter unit.

Figure 10:
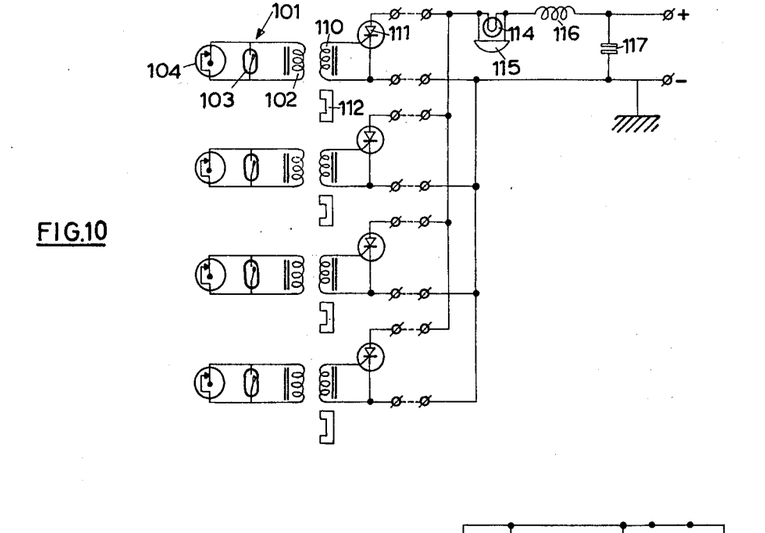
FIG. 10 is a circuit diagram of an improved apparatus in its simplest form.
Figure 13:
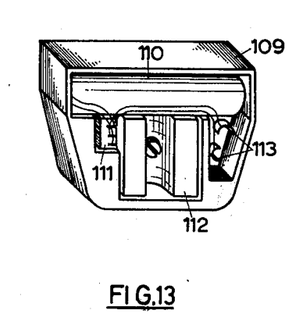
FIG. 13 is an oblique projection of the improved receiver unit with the front cover thereof removed.
Figure 14:
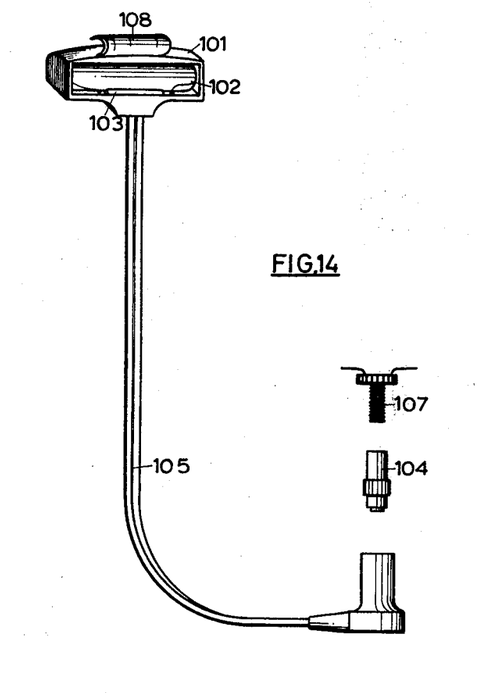
FIG. 14 is an oblique projection of the improved transmitter unit with the front thereof removed.

Thus in the embodiment illustrated in FIG. 10 in combination with FIGS. 13 and 14, the device, as applied to a tire pressure warning device, comprises a transmitter unit 101 having a single low impedance coil 102 having its two ends interconnected through a normally open reed switch 103 and normally closed pressure operated switch 104 which are arranged in parallel. The pressure operated switch is connected to the coil by way of leads 105 (FIG. 14) which, in the operative condition, pass through an aperture in the wheel to the tire valve 107 on which the pressure switch is located.

Finally, the transmitter unit is provided with a plate 108 shaped to enable the unit to be clipped to a motor vehicle wheel after the manner of a wheel balancing weight, as described above with respect to FIG. 7. Also, as before, the parts are encapsulated in a suitable resin which is preferably reinforced with glass fibers or the like.

The receiver unit 109 (FIG. 13) comprises a single coil 110 connected between the gate of a silicon controlled rectifier 111 (S.C.R.) and the motor vehicle earth or negative. The SCR, as well as a permanent magnet 112, which is preferably made of sintered metal to provide a high density magnetic field, are also encapsulated with the coil 110 in the receiver unit with only two spade terminals (the inner ends of which are indicated at 113) protruding from the resin material. Both of these units are made by manufacturing a casing of glass fiber or other reinforced resin or other tough non-corrosive material, locating and connecting the component parts and encapsulating the latter by embedding them in synthetic resin. This construction avoids any corrosion or other damage being suffered by the electronic parts.

In use, the SCR is arranged to close a direct circuit through a red light bulb 114, one of which may be associated with each receiver unit as described above. However, as illustrated in its simplest form, only one bulb is provided for all (in this case four) receiver units. In parallel with the red light bulb a buzzer 115 may be provided if required.

It will be understood that with the above arrangement only one wire is required for each receiver unit, since the chassis acts as the other wire. Also, this wire, since it is simply carrying a d.c. current need not be shielded as in the case where the SCR is located in the display panel of our earlier proposals. If any interference is experienced a suitable choke 116 and capacitor 117 may be included in the circuit in known manner.

In use, the red light bulb will be off when all is in order, since the pressure switch will be closed and thus will cause no back E.M.F. to be produced in the transmitter coil when the reed switch closes and opens each time the two units pass each other. If the pressure switch opens a back E.M.F. will be produced in the transmitter coil which will cause a sufficiently large E.M.F. in the receiver unit to trigger the SCR. Thus the buzzer will sound and the red light bulb concerned become illuminated.

It will be understood that the design of the coils must be such that the above-described function will take place. Also, the receiver unit must not be too close to the wheel and generally a gap between the receiver and transmitter units when they are at their closest to each other of about 1.5 cms is considered acceptable. One design of the coils which has been found to give the desired results is the following.

In this case each coil is made with a high permeability ferrite core and number 30 standard gauge copper wire. In the case of the transmitter coil 102, there are 375 turns and the core is 1⅞ inches long with a diameter of ¼ inch. This gives a coil having an inductance of about 3.8 mH. The receiver coil has 500 turns and its core is the same size as the other. This gives a coil having an inductance of about 6.75 mH. Both of these coils have a low impedance which makes the circuit less susceptible to any form of external interference.

Many additions may be made to the abovedescribed embodiment of the invention in order to provide added facilities.

Figure 11:
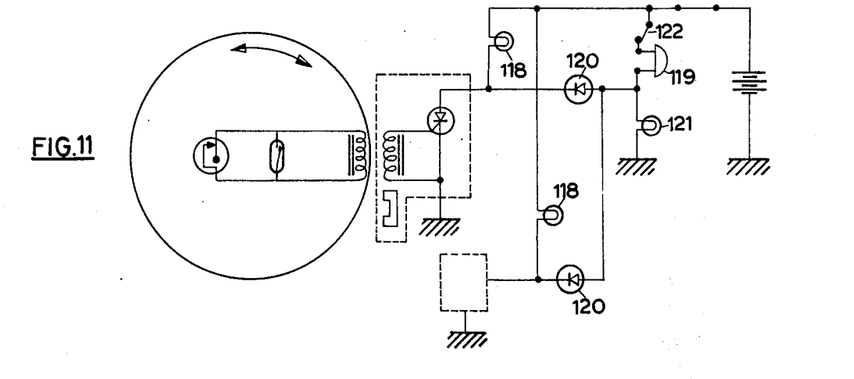
FIG. 11 is a circuit diagram of a somewhat more sophisticated embodiment.

Thus, in the embodiment of the invention, the circuit diagram of which is given in FIG. 11, the same transmitter and receiver units are utilized as in the embodiment of the invention just described. In this embodiment of the invention a separate red light bulb 118 is provided for each receiver unit. This is effected simply by inserting a red light bulb in each power supply line to an SCR as illustrated. In this case the display panel described in our parent patent application Ser. No. 252,227 is used so that the exact location of a tire pressure fault is immediately known from the panel.

Only one buzzer 119 is used in this case, this being connected in parallel to the light bulbs 118, through a diode 120 to the opposite side of each red light bulb.

Also, a green light bulb 121 is connected in series with the buzzer but to earth so that while the unit is on trickle current will pass through the coil of the buzzer to illuminate the green light bulb without activating the buzzer. This is the reason for the presence of the diodes which thus prevent a short circuit through the red light bulbs. The buzzer may be provided with a switch 122 such that the buzzer can be switched out of the circuit. The green light bulb is this case would be off thus indicating that the buzzer is switched out of the circuit.

In this embodiment the assembly operates in the same manner as that described above except for the fact that the location of a fault is indicated by the display panel. Also, when a red light bulb switches on the green light bulb will go off if it is in circuit because of the relatively low resistance path in parallel with it and through the diode and SCR.

Figure 12:
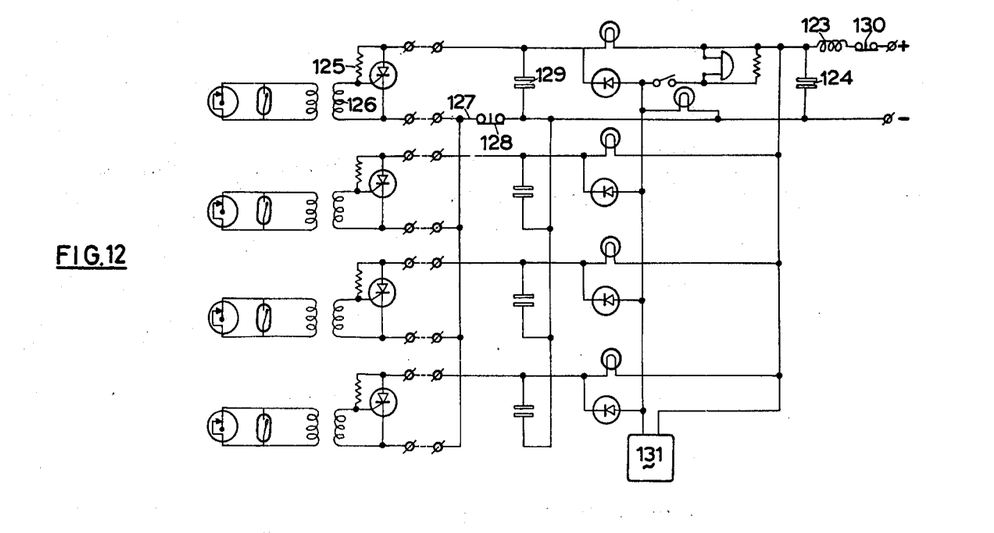
FIG. 12 is a circuit diagram of a still more sophisticated embodiment.

A still more sophisticated system is illustrated in the circuit diagram of FIG. 12. In this case the assembly is similar to that shown in FIG. 11, except that the suppression choke 123 and capacitor 124 are included as well as a test circuit which enables the system to be checked. This circuit involves the inclusion of a resistor 125 each of in the receiver units. These resistors are connected in series with the associated receiver coil 126 to form a voltage divider across the positive and negative supplies in order to bias the SCR. In this case two wires are required since the return wire 127 from the receiver units is interrupted by a normally closed test button switch 128. Also a capacitor 129 is required between the two leads to each receiver unit as an extra safeguard against interference triggering the biased SCR. Also, a cancel button switch 130 is located in the supply lead to the circuit.

If it is now required to check the functioning of the receiver units, the test button is operated to open the return circuit. This causes the now-biased SCR to be triggered, thereby bringing it into a conducting condition. When the button is released, the SCRs will remain in the conducting condition until the cancel button is depressed to open the circuit. Thus, in testing, all the red light bulbs should light up and the green one go out. Also, if the buzzer is in circuit it should sound. In the event of a failure occurring in the light bulb, the wiring leading to the receiver units, the resistors 125, the coil 126 or the SCR, then the light bulb associated with the defective circuit will not light up.

In all the above cases, if the coil in a receiver unit goes open circuit a warning will be given and also if the connections between transmitter unit and pressure switch become open circuit a warning will be given.

Finally, if a record of warnings given by the system is required a tachograph 131 may be connected to a suitable point in the circuit such as in the return lead to the circuit.

It will be appreciated that the system described with reference to FIGS. 10 to 14 are simpler, less expensive to manufacture and less susceptible to interferences owing to the improved design of the receiver and transmitter units thereof.

It will be understood that the temperature or pressure switches above referred to could be replaced by any other sensing switches adapted to open or close, as the case may be upon the desired physical condition of the rotating member or a part thereof, deviating outside a predetermined limit.

Also, the arrangment may be applied to any rotating member other than a wheel, for example, parts of mechanical machinery or the like.

Where the speed of rotation of a body is of concern, the same system as above described could be used with the omission of the sensing switch; in this case the comparison being between the frequency of the pulses against a reference frequency. The reference frequency could be that of a similarly created chain of pulses created by a member which is to rotate at the same speed as the body. Thus the body could be one part of a clutch or other power transmission chain and the other member another part thereof, thereby constituting a device for warning of slippage. In the case of a vehicle clutch, the device may be arranged to be turned off during gear changes. In this case, the source of magnetic field on the rotating members could, since they need never be switched off, be permanent magnets which would replace the closed coil circuits and magnet on the stationary member. A similar system could be designed to sense loss of angular movement in belt transmission systems, or actual revolutions as in the case of lathe operations which are preferably carried out at predetermined speeds. Also, a system could be designed for regulating the speed of propellers on multi-engined aircraft relative to each other.

It will be understood that there are numerous other applications to which the invention could be put, the basis being the transmission of information utilizing pulses created in a stationary receiving coil by moving permanent or intermittent magnetic fields. Thus, the invention could even be applied to linearly moving objects or reciprocating or oscillating objects such as lifts, mine hoists or railway lines, for example.

What we claim as new and desire to secure by Letters Patent of the United States is:

1. A warning device associated with a movable body comprising:
    transmitter means mounted on said body to move therewith, said transmitter means including a single transmitter coil and a condition-responsive switch electrically interconnected with said coil whereby a circuit is completed through the coil dependent upon the position of the switch;
    receiver means mounted on a stationary body adjacent said movable body, said receiver means including a single receiver coil and a magnetic field source, said source being capable of inducing a current in said transmitter coil when proximate said transmitter coil;
    a magnetically operated switch connected in parallel with said transmitter coil and operated by said source as current is induced in said transmitter coil so as to produce a back E.M.F. which is inductively coupled by the transmitter coil to said receiver coil when the condition-responsive switch is positioned to prevent completion of said circuit through the transmitter coil and the condition-responsive switch; and
    means joined to said receiver coil and responsive to a predetermined level of voltage induced on the receiver coil as a result of said back E.M.F. for providing a warning upon occurrence of a condition which changes the position of said condition-responsive switch to one preventing completion of said circuit.

2. A warning device as set forth in claim 1, wherein said movable body is rotatable.

3. A warning device as set forth in claim 1, wherein said magnetically operated switch is a normally-open reed switch.

4. A warning device as set forth in claim 1, wherein said condition-responsive switch and said magnetically operated switch each are connected in parallel with said transmitter coil.

5. A warning device as set forth in claim 4, wherein said magnetically operated switch is a normally-open reed switch and wherein said condition-operated switch is a normally closed switch which is opened on occurrence of the condition which changes the position of said condition-responsive switch.

6. A warning device as set forth in claim 1, wherein said means responsive to a predetermined level of voltage induced on the receiver coil includes a silicon-controlled rectifier biased by said induced voltage and display means connected to said silicon-controlled rectifier.

* * * * *